(12) United States Patent
Chung et al.

(10) Patent No.: US 10,317,040 B2
(45) Date of Patent: Jun. 11, 2019

(54) DIFFUSER SHEET HAVING BASE LAYER WITH BEADS AND PORES AND DISPLAY DEVICE HAVING THE SAME

(71) Applicant: LG Display Co., Ltd., Seoul (KR)

(72) Inventors: Donghyun Chung, Seoul (KR); Jongwan Park, Goyang-si (KR); Kiduck Park, Paju-si (KR); Junsoo Park, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/678,472

(22) Filed: Aug. 16, 2017

(65) Prior Publication Data
US 2018/0058659 A1    Mar. 1, 2018

(30) Foreign Application Priority Data

Aug. 31, 2016 (KR) .................. 10-2016-0112135

(51) Int. Cl.
| | |
|---|---|
| F21V 3/00 | (2015.01) |
| B32B 5/18 | (2006.01) |
| B32B 27/06 | (2006.01) |
| F21V 19/00 | (2006.01) |
| F21Y 113/13 | (2016.01) |
| F21Y 115/00 | (2016.01) |

(52) U.S. Cl.
CPC .................. *F21V 3/00* (2013.01); *B32B 5/18* (2013.01); *B32B 27/06* (2013.01); *F21V 19/0015* (2013.01); *B32B 2307/536* (2013.01); *B32B 2309/105* (2013.01); *B32B 2457/20* (2013.01); *F21Y 2113/13* (2016.08); *F21Y 2115/00* (2016.08)

(58) Field of Classification Search
CPC ....... G02B 5/0242; G02B 5/0247; F21V 3/00; F21V 3/0615
See application file for complete search history.

(56) References Cited

U.S. PATENT DOCUMENTS

| | | | | |
|---|---|---|---|---|
| 7,569,257 | B2* | 8/2009 | Ha | G02B 5/0242 349/64 |
| 8,197,931 | B2* | 6/2012 | Ueda | B32B 27/08 264/288.4 |
| 9,465,145 | B2* | 10/2016 | Coggio | G02B 1/11 |
| 9,588,262 | B2* | 3/2017 | Coggio | G02B 5/0242 |
| 2006/0193040 | A1* | 8/2006 | Kim | G02B 5/0242 359/422 |
| 2006/0290253 | A1* | 12/2006 | Yeo | G02B 5/0226 313/116 |
| 2009/0220742 | A1* | 9/2009 | Wang | G02B 5/0226 428/147 |
| 2016/0320537 | A1* | 11/2016 | Ko | B29D 11/00278 |

FOREIGN PATENT DOCUMENTS

| | | |
|---|---|---|
| KR | 10-2009-0060067 A | 6/2009 |
| KR | 10-2010-0029935 A | 3/2010 |
| KR | 10-2015-0078300 A | 7/2015 |

\* cited by examiner

*Primary Examiner* — Robert J May
(74) *Attorney, Agent, or Firm* — Morgan, Lewis & Bockius LLP (57) ABSTRACT

A diffuser sheet and display device having the same are provided. The diffuser sheet includes a base layer, a first skin layer on an upper surface of the base layer, and a second skin layer on a lower surface of the base layer. The base layer includes a base resin, a plurality of beads dispersed in the base resin, and a plurality of pores dispersed in the base resin.

20 Claims, 5 Drawing Sheets

DIFFUSER SHEET HAVING BASE LAYER WITH BEADS AND PORES AND DISPLAY DEVICE HAVING THE SAME

This application claims the priority of Korean Patent Application No. 10-2016-0112135 filed on Aug. 31, 2016, in the Korean Intellectual Property Office, the disclosure of which is hereby incorporated by reference in its entirety.

BACKGROUND

Technical Field

The present disclosure relates to a diffuser sheet capable of realizing a high opacity without deterioration of impact resistance and improving image quality, and a display device having the same.

Description of the Related Art

An LCD device comprises a display panel including an array substrate, a color filter substrate, and a liquid crystal layer interposed between the array substrate and the color filter substrate. The LCD device varies its transmittance by changing the orientation of liquid crystal molecules by applying electric field across the display panel.

Such a display panel includes no self-luminous elements and, thus, requires a separate light source to display images by varying transmittance. To this end, a backlight unit is mounted on the back side of the display panel.

As a light source for the backlight unit, a cold cathode fluorescent lamp (CCFL), an external electrode fluorescent lamp, or a light-emitting diode (LED) may be used. Among these light sources, the LED is widely used as a light source for displays because it has a small size, low power consumption, and high reliability.

Such backlight units may be classified into an edge-type backlight and a direct-type backlight according to arrangement of the light source. The edge-type backlight unit has a light source disposed on a side surface of a light guide plate for guiding light, while the direct-type backlight unit has a light source disposed on the back of a diffuser sheet for diffusing light.

The direct-type backlight unit includes a reflection plate, light sources arranged on an upper surface of the reflection plate, and an optical member, such as a diffuser sheet or a prism sheet, disposed at an upper side spaced apart from the light sources. When the direct-type backlight unit is designed to have a large thickness, the distance between the diffuser sheet and the light sources is increased such that the optical distance is increased to thereby reduce lattice mura.

However, in recent years, research and development has been active to reduce the thickness of the direct-type backlight unit according to the trend of lightweight and thin design. As a result, the backlight unit is becoming thinner. If the backlight unit is designed to be thin, the distance between the diffuser sheet and the light source may be shortened, and thus, the optical distance may be shortened. As a result, lattice mura is produced, thereby lowering the opacity.

SUMMARY

Accordingly, embodiments of the present disclosure are directed to a diffuser sheet and a display device having the same that substantially obviate one or more of the problems due to limitations and disadvantages of the related art.

An aspect of the present disclosure is to provide a diffuser sheet capable of realizing high opacity without deterioration of impact resistance and improving image quality and a display device having the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a diffuser sheet comprises a base layer, the base layer including: a base resin, a plurality of beads dispersed in the base resin, and a plurality of pores dispersed in the base resin; a first skin layer on an upper surface of the base layer; and a second skin layer on a lower surface of the base layer.

In another aspect, a display device comprises a display panel; a main supporter under the display panel to support an edge of the display panel; a cover bottom coupled to the main supporter; a light source mounted on an upper surface of the cover bottom; and an optical member seated on the main supporter or the cover bottom, the optical member including at least a diffuser sheet, wherein the diffuser sheet comprises: a base layer, the base layer including: a base resin, a plurality of beads dispersed in the base resin, and a plurality of pores dispersed in the base resin; a first skin layer on an upper surface of the base layer; and a second skin layer on a lower surface of the base layer.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

The above objects, features, and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Hereinafter, a diffuser sheet and a display device having the same according to a example embodiments of the present disclosure will be described in detail with reference to the accompanying drawings.

Figure 1:
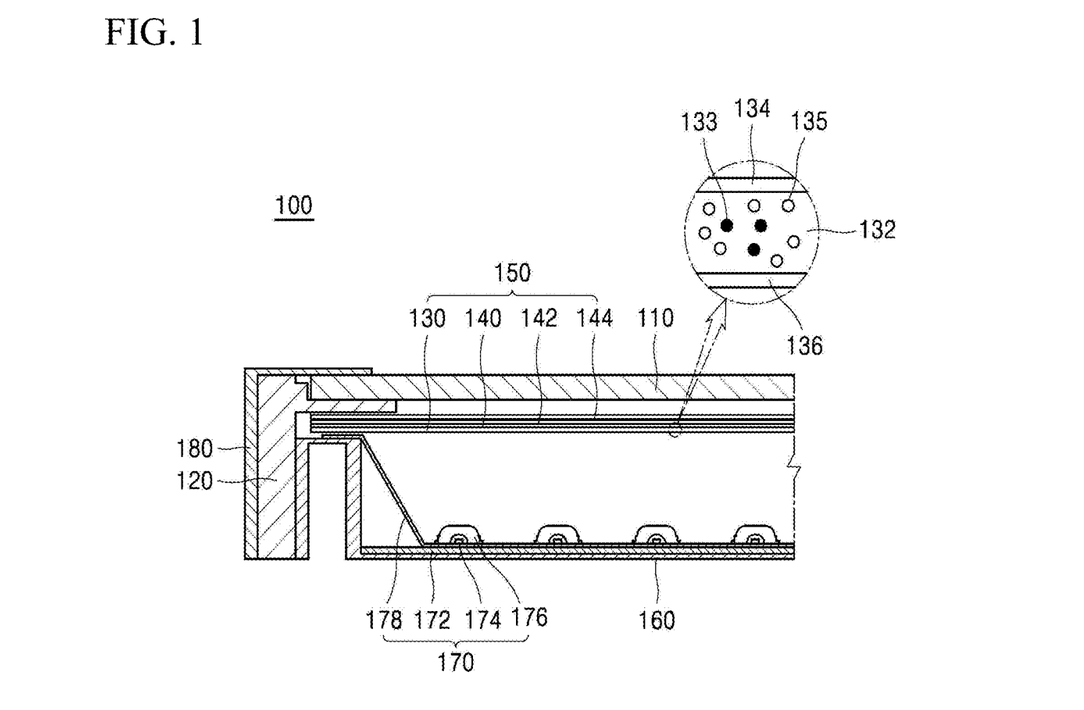
FIG. 1 is an assembled cross-sectional view showing a portion of a display device according to an example embodiment of the present disclosure.

FIG. 1 is an assembled cross-sectional view showing a portion of a display device according to an example embodiment of the present disclosure.

In FIG. 1, a display device 100 according to an example embodiment of the present disclosure includes a display panel 110, a main supporter 120, an optical member 150, a cover bottom 160, a light source 170, and a top case 180. The display panel 110 plays a key role in realizing images. Although not shown in detail in the drawings, the display panel 110 includes first and second substrates (not shown) attached together with a predetermined spacing there between and a liquid crystal layer interposed between the first and second substrates. Here, various wirings and pixel electrodes as well as thin film transistors are arranged on the first substrate, and a color filter layer and a black matrix for displaying RGB primary colors are arranged on the second substrate.

The main supporter 120 is disposed under the display panel 110 to support the edge of the display panel 110. To this end, the main supporter 120 may have a rectangular frame shape.

The optical member 150 may be seated directly on the cover bottom 160 or seated on a reflection plate 178 that is seated on the cover bottom 160. Accordingly, the optical member 150 may be disposed below the display panel 110. Alternatively, the optical member 150 may be seated directly on the main supporter 120 or seated on a reflection plate 178 that is seated on the main supporter 120, although not shown in detail in the drawings. In this case, the main supporter 120 is designed to have a step partially protruding inward to cover the upper portion of the edge of the cover bottom 160. Here, the optical member 150 refracts or scatters light incident from the light source 170 to widen the viewing angle of the display device 100 and increase luminance.

To this end, the optical member 150 includes at least a diffuser sheet 130. The optical member 150 may further include at least one of a prism sheet 140, a protection sheet 142, and a double luminance enhancement film (DBEF) 144.

FIG. 1, as an example, shows a four-layer structure in which the diffuser sheet 130, the prism sheet 140, the protection sheet 142, and the DBEF 144 are sequentially stacked on the optical member 150. Here, the diffuser sheet 130 diffuses light emitted from the light source 170 along the surface, thereby making the color and luminance of the screen of the display device 100 uniform. In addition, the diffuser sheet 130 serves as a support for maintaining the light distance such that the optical member 150 is not sagged.

The diffuser sheet 130 includes a base layer 132 disposed in the middle thereof, a first skin layer 134 disposed on the upper surface of the base layer 132, and a second skin layer 136 disposed on the lower surface of the base layer 132. Here, the base layer 132 has beads 133 and pores 135 dispersed therein. As described above, the base layer 132 may secure a high opacity at a low cost without deterioration of impact resistance as the beads 133 and the pores 135 dispersed therein are mixed at a determined content ratio. A detailed description thereof will be given later.

The prism sheet 140 serves to refract or condense light diffused by the diffuser sheet 130 to increase luminance. The protection sheet 142 serves to protect the diffuser sheet 130 and the prism sheet 140 from external shock or foreign matter. In addition, the protection sheet 142 is provided to prevent scratches on the prism sheet 140.

The DBEF 144 is provided to improve luminance. The DBEF 144 is a kind of polarizing film and may be referred to as a reflective polarizing film. The DBEF 144 transmits a polarized light ray arranged in a direction parallel to the polarization direction of the DBEF 144 among the light rays emitted from the light source 170 and reflects polarized light rays arranged in a direction different from the polarization direction of the DBEF 144, thereby enhancing luminance.

The cover bottom 160 is coupled to the main supporter 120. The edges of both sides of the cover bottom 160 may be bent upward to form a side surface. Accordingly, a side surface of the cover bottom 160 may be arranged to contact the side surface of the main supporter 120.

The light source 170 is mounted on the cover bottom 160 and disposed below the optical member 150. As the light source 170, any one selected from among a cold cathode fluorescent lamp (CCFL), an external electrode fluorescent lamp, and a light emitting diode (LED) may be used. For example, an LED may be employed.

In this regard, FIG. 1 illustrates an LED package module employed as the light source 170. The LED package module 170 includes a substrate 172 and a plurality of LED packages 174 mounted on the substrate 172 to emit light toward the display panel 110. The LED package module 170 may further include a lens 176 mounted on the substrate 172 to cover the upper side of the LED package 174, and a reflection plate 178 disposed on the substrate 172 to reflect light emitted from the LED packages 174 toward the lens 176. However, the lens 176, for example, is not necessary and may be omitted.

The reflection plate 178 may be formed on the entire upper surface of the substrate 172, except the mounting area of the LED packages 174, to secondarily reflect light emitted from the LED packages 174 upward. In this case, the optical member 150 may be seated directly on the cover bottom 160. Alternatively, the reflection plate 178 may be designed such that the edges thereof are bent to extend upward from the cover bottom 160 to maximize reflection efficiency. In this case, the optical member 150 may be seated on the reflection plate 178 disposed on the cover bottom 160.

Here, in one configuration, the plurality of LED packages 174 emits light having red (R), green (G), and blue (B) colors toward the display panel 110. By simultaneously turning on the plurality of LED packages 174, white light may be implemented by a color combination.

With a display device 100 of the direct-type structure shown in FIG. 1, light rays emitted from neighboring LED packages 174 are superimposed and mixed with each other and then directly incident on the display panel 110 to provide a surface light source. At this time, the direct-type display device 100 sequentially turns the plurality of LED packages 174 on/off to display a more vivid image in a local dimming method of supplying light to each specific area of the display panel 110. Accordingly, the contrast ratio may be improved by making a bright image brighter or making a dark image darker, thereby realizing a more vivid image. The top case 180 is mounted on the display panel 110 and coupled with the main supporter 120 and the display panel 110.

The display device according to the embodiment of the present disclosure described above includes a base layer, a first skin layer disposed on the upper surface of the base layer, and a second skin layer disposed on the lower surface of the base layer. The base layer has a diffuser sheet including a base resin, a plurality of beads dispersed in the base resin, and a plurality of pores dispersed in the base resin.

Here, the display device according to an embodiment may improve image quality by securing a high opacity at low cost without deterioration of impact resistance by mixing the pores and the beads at a determined content ratio and adding the same into the base layer. Details will be described with reference to the accompanying drawings.

Figure 2:
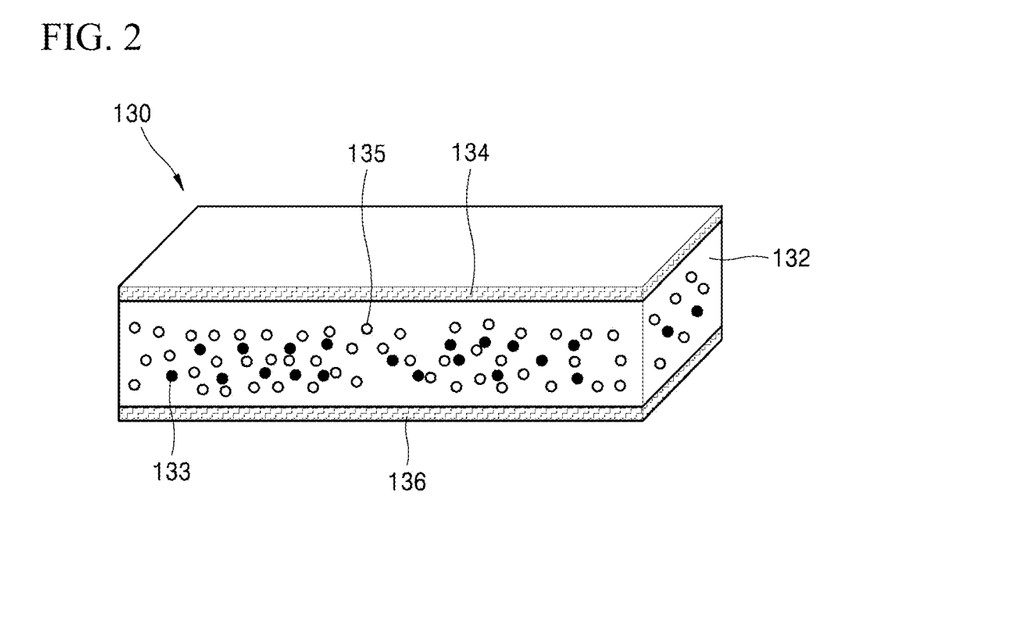
FIG. 2 is an enlarged perspective view showing a diffuser sheet according to an example embodiment of the present disclosure.
Figure 3:
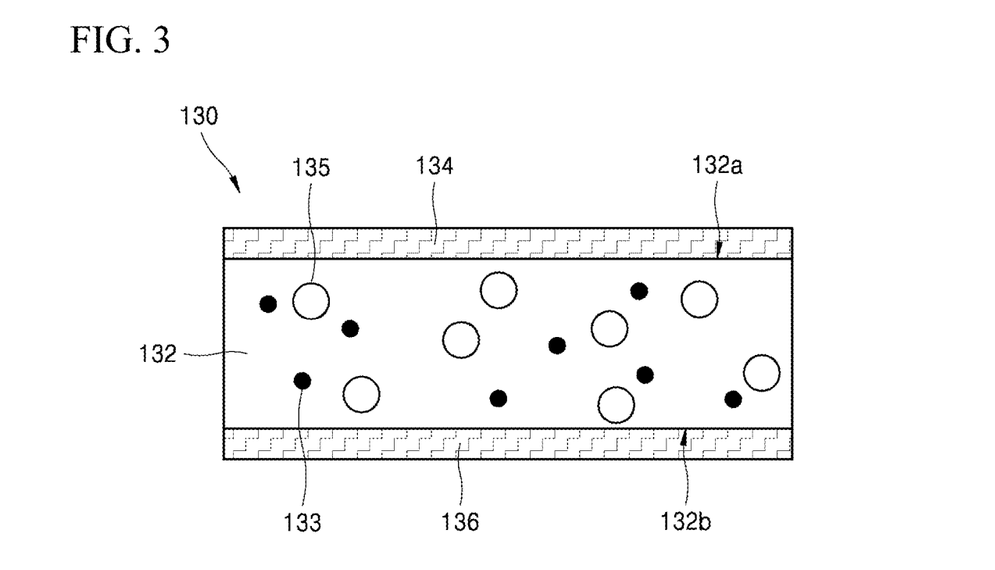
FIG. 3 is an enlarged cross-sectional view showing a diffuser sheet according to an example embodiment of the present disclosure.

FIG. 2 is an enlarged perspective view showing a diffuser sheet according to an example embodiment of the present disclosure, and FIG. 3 is an enlarged cross-sectional view showing a diffuser sheet according to an example embodiment of the present disclosure.

As shown in FIGS. 2 and 3, the diffuser sheet 130 according to an example embodiment of the present disclosure includes a first skin layer 134, a second skin layer 136, and a base layer 132.

Here, the diffuser sheet 130 may be fabricated by laminating the first and second skin layers 134 and 136, formed of the same kind of resin material as the base resin, on both surfaces of the base layer 132 in the form of a sheet formed by adding the beads 133 and a chemical foaming agent to the base resin and mixing the same, coextruding the stacked layers, and then curing the surfaces of the first and second skin layers 134 and 136 while performing foaming though a heat treatment process of IR heating.

Accordingly, the first and second skin layers 134 and 136 and the base layer 132 are all made of the same type of resin material, and have an integrated structure in which the layers are integrally attached together by coextrusion. As a result, the plurality of beads 133 and pores 135 exists only in the base layer 132. Neither beads 133 nor pores 135 exist in any of the first and second skin layers 134 and 136.

The first skin layer 134 is disposed on the upper surface 132a of the base layer 132 and the second skin layer 136 is disposed on the lower surface 132b of the base layer 132. Each of the first and second skin layers 134 and 136 may be formed of at least one material selected from among polystyrene (PS), polycarbonate (PC), polyethylene terephthalate (PET), polyethylene naphthalate (PEN), polybutylene terephthalate (PBT), polymethyl methacrylate (PMMA), polypropylene (PP), and the like. Any resin may be used as long as it is usable for the diffuser sheet.

Here, the surfaces of the first and second skin layers 134 and 136 are cured by a surface heat treatment to obtain a hardness greater than that of the base layer 132. More specifically, each of the first and second skin layers 134 and 136 has a pencil hardness of 3H to 4H, and the base layer 132 has a pencil hardness of 1H to 2H.

As described above, all of the base layer 132 and the first and second skin layers 134 and 136 may be formed of the same kind of resin material. This is because using the same kind of resin material for the base layer 132 and the first and second skin layers 134 and 136 may provide more reinforcing bonding between the base layer 132 and the first and second skin layers 134 and 136 in the process of bonding through coextrusion.

Each of the first and second skin layers 134 and 136 may have a thickness of 50 μm to 150 μm. If the thickness of each of the first and second skin layers 134 and 136 is less than 50 μm, the mechanical strength thereof may be weakened. If the thickness of each of the first and second skin layers 134 and 136 exceeds 150 μm, the opacity may be lowered.

The base layer 132, which includes the body of the diffuser sheet 130, may have a thickness of 200 μm to 1,000 μm. If the thickness of the base layer 132 is less than 200 μm, it is difficult to secure a proper strength, and thus it is difficult to secure the light distance due to defective sagging of the diffuser sheet 130. If the thickness of the base layer 132 exceeds 1,000 μm, the light source on the back of the base layer 132 may be seen due to lack of opacity.

The base layer 132 has a base resin, a plurality of beads 133 dispersed in the base resin, and a plurality of pores 135 dispersed in the base resin.

Here, the pores 135 have a weight ratio higher than the weight ratio of the beads 133. More specifically, the base layer 132 may include beads of 1.5 to 4.5 wt %, pores of 5.5 to 8.5 wt %, and the base resin of a remaining wt %. As described above, in designing the base layer 132, if the beads 133 and the pores 135 are mixed with each other at the determined composition ratio, a high opacity may be secured without deterioration of impact resistance.

Similar to the material of each of the first and second skin layers 134 and 136, the base resin may be formed of at least one material selected from among polystyrene (PS), polycarbonate (PC), polyethylene terephthalate (PET), polyethylene naphthalate (PEN), polybutylene terephthalate (PBT), polymethyl methacrylate (PMMA), polypropylene (PP), and the like. Any resin may be used as long as it is usable for the diffuser sheet.

The beads 133 are randomly dispersed in the base resin to increase impact resistance and to diffuse light incident from the light source 170 (see FIG. 1) to improve the opacity.

The beads 133 may have a circular shape or an elliptical shape when the cross section thereof is viewed, but are not limited thereto. Any shape may be used as long as the beads 133 can maintain a constant shape in the base resin.

The beads 133 may be formed of at least one material selected from among silica ($SiO_2$), calcium carbonate ($CaCO_3$), barium sulfate ($BaSO_4$), titanium oxide ($TiO_2$), aluminum hydroxide ($Al(OH)_3$), magnesium oxide (MgO), zinc oxide ($ZnO_2$), and the like may be used, but the present disclosure is not limited thereto.

For example, the beads 133 may be added at a content ratio of 1.5 wt % to 4.5 wt % of the total weight of the diffuser sheet 130. If the amount of the beads 133 added is less than 1.5 wt % of the total weight of the diffuser sheet 130, the amount may be insufficient and thus it may be difficult to property exhibit the effect of the added beads. On the other hand, if the amount of the beads 133 added exceeds 4.5 wt % of the total weight of the diffuser sheet 130, the impact strength and the opacity will be improved, but luminance may be greatly lowered due to the excessive amount of the beads 133. In addition, adding a large amount of the beads 133, which are relatively expensive, may increase the manufacturing cost.

Further, the average diameter of the beads 133 may be 10 μm to 20 μm. If the average diameter of the beads 133 is less than 10 μm, it may be difficult to properly exhibit the light diffusion effect, and thus it may be difficult to achieve the effect of improving the opacity. On the other hand, if the average diameter of the beads 133 exceeds 20 μm, the impact strength may be improved, but luminance may be significantly lowered due to an excessive increase of opacity. The pores 135 are randomly dispersed in the base resin to minimize decrease in luminance and improve opacity.

Unlike the beads 133, the pores 135 may diffuse light incident from the light source toward the display panel 110 (see FIG. 1) without reflecting the light toward the light source. Therefore, the opacity may be improved without deterioration of luminance.

That is, the diffuser sheet 130 according to example embodiments of the present disclosure may strictly control the amount of the added beads 133 and pores 135 at a determined content ratio, thereby realizing a high opacity without deterioration of luminance and impact strength to improve image quality. These pores 135 may be dispersed in the base resin through a foaming process performed after a foaming agent is added to the base resin having the beads added thereto in fabricating the diffuser sheet 130.

Here, the pores 135 may be added at a content ratio of 5.5 wt % to 8.5 wt % of the total weight of the diffuser sheet 130. If the amount of the pores 135 added is less than 5.5 wt % of the total weight of the diffuser sheet 130, the amount is insufficient and thus it may be difficult to properly exhibit the effect of the added pores. On the other hand, if the amount of the pores 135 added exceeds 8.5 wt % of the total weight of the diffuser sheet 130, the impact strength may be greatly lowered.

For example, the average diameter of the pores 135 may be 50 μm to 200 μm. If the average diameter of the pores 135 is less than 50 μm, it may be difficult to properly exhibit the light diffusion effect, and thus, it may be difficult to improve the opacity. On the other hand, if the average diameter of the pores 135 exceeds 200 μm, the mechanical strength may be lowered due to the excessive design of the pores 135, and the impact strength may be greatly lowered.

Figure 4:
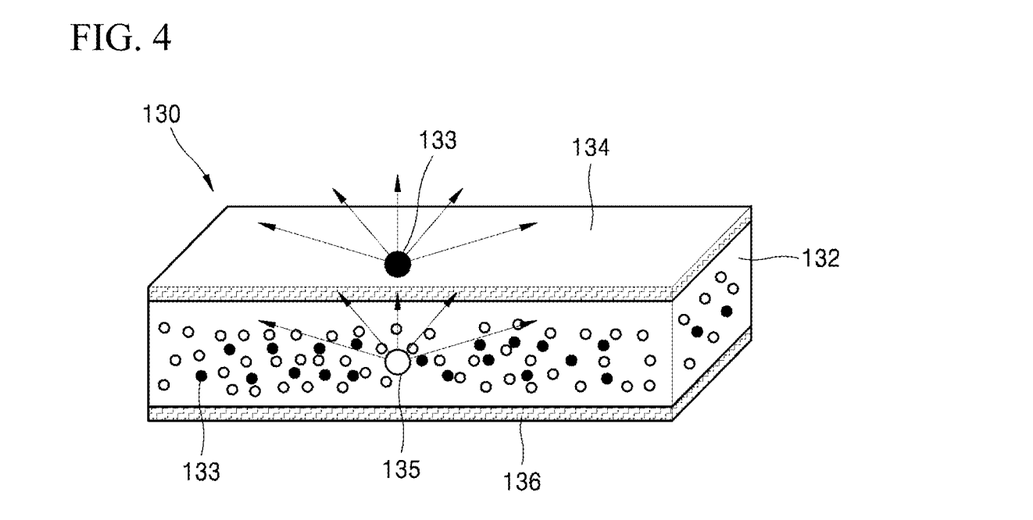
FIG. 4 is a diagram illustrating the diffusion principle of a diffuser sheet according to an example embodiment of the present disclosure.

FIG. 4 is a diagram illustrating the diffusion principle of a diffuser sheet according to an embodiment of the present disclosure.

As shown in FIG. 4, in the diffuser sheet 130 according to an example embodiment of the present disclosure, light incident from the light source 170 (see FIG. 1) disposed on the back of the diffuser sheet 130 is diffused into the base layer 132 primarily by the beads 133 dispersed in the base layer 132, and then diffused secondarily by the pores 135 dispersed in the base layer 132.

In this way, a high opacity may be secured by primary light diffusion by the plurality of pores 135 and secondary light diffusion by the plurality of beads 133, deterioration of luminance may be prevented by the plurality of pores 135, and an appropriate impact strength may be secured by adding the plurality of beads 133.

As described above with reference to example embodiments of the present invention, a diffuser sheet 130 and a display device having the same may include first and second skin layers 134 and 136 disposed on both sides of a base layer 132, and a plurality of beads 133 and a plurality of pores 135 dispersed in the base layer 132.

As a result, the diffuser sheet 130 and a display device having the same may realize high opacity without degrading luminance and impact strength by adding a plurality of pores 135 and a plurality of beads 133 into the base layer 132 at a determined content ratio.

Accordingly, the diffuser sheet 130 may secure an impact strength of 1.0 kJ/m$^2$ to 1.5 kJ/m$^2$ by mixing the pores 135 and the beads 133 at a determined content ratio in the base layer 132. Accordingly, a high opacity may be implemented at a low cost without deterioration of impact resistance, thereby improving image quality.

Further, for the diffuser sheet 130, an integrated structure may be formed as the first and second skin layers 134 and 136 and the base layer 132 are formed of the same resin material and integrally attached together by coextrusion.

In addition, because the diffuser sheet 130 can realize a high opacity without deteriorating luminance and impact strength, degradation of image quality may be addressed even if the number of light sources is reduced. Therefore, price competitiveness may be secured according to reduction of the number of light sources.

In addition, because the diffuser sheet 130 may have a structure in which the first and second skin layers 134 and 136 having a hardness greater than that of the base layer 132 are disposed on both sides of the base layer 312, fracture by pressing may be prevented by the first and second skin layers 134 and 136.

Additionally, because the diffuser sheet 130 may have a structure in which the first and second skin layers 134 and 136 having the same structure are disposed on both sides of the base layer 132, the same structure may be maintained even if the positions of the first and second skin layers 134 and 136 are changed. Therefore, the diffuser sheet 130 may be used regardless of the lamination position of the diffuser sheet 130.

Embodiments

Hereinafter, configuration and operation of the present disclosure will be described in more detail with reference to example embodiments of the present disclosure. It is to be understood, however, that the disclosure is not limited to the disclosed example embodiments.

Other details which are not described herein can be sufficiently technically derived by those skilled in the art, and therefore a description thereof will be omitted.

1. Fabrication of Diffuser Sheet

Diffuser sheets according to Examples 1 to 3 and Comparative Examples 1 to 8 were fabricated with the compositions shown in Table 1.

Here, the diffuser sheets according to Examples 1 to 3 and Comparative Examples 2 to 7 were fabricated by laminating first and second skin layers of a polystyrene (PS) resin on both surfaces of a base layer in a sheet form prepared by mixing and providing $SiO_2$ and a chemical foaming agent in a PS resin and co-extruding the layers.

Next, the surfaces of the first and second skin layers were cured while foaming the diffuser sheet for 15 seconds with both surfaces of the diffuser sheet maintained at 170° C. using the IR heating technique. Here, the thickness of the base layer was 800 μm, and the thickness of each of the first and second skin layers was 100 μm.

In Comparative Example 1, a diffuser sheet was fabricated in the same manner as in Example 1, except that beads were not added to the polystyrene resin of the base layer.

In Comparative Example 8, a diffuser sheet was fabricated in the same manner as in Example 1, except that no foaming agent was added to the base layer.

TABLE 1

| | (unit: wt %) | | |
|---|---|---|---|
| | Beads | Pores | Base resin |
| Example 1 | 2 | 8 | 90 |
| Example 2 | 3 | 7 | 90 |
| Example 3 | 4 | 6 | 90 |
| Comparative Example 1 | 0 | 10 | 90 |

TABLE 1-continued (unit: wt %)

|  | Beads | Pores | Base resin |
|---|---|---|---|
| Comparative Example 2 | 1 | 9 | 90 |
| Comparative Example 3 | 5 | 5 | 90 |
| Comparative Example 4 | 6 | 4 | 90 |
| Comparative Example 5 | 7 | 3 | 90 |
| Comparative Example 6 | 8 | 2 | 90 |
| Comparative Example 7 | 9 | 1 | 90 |
| Comparative Example 8 | 10 | 0 | 90 |

2. Property Evaluation

Figure 5:
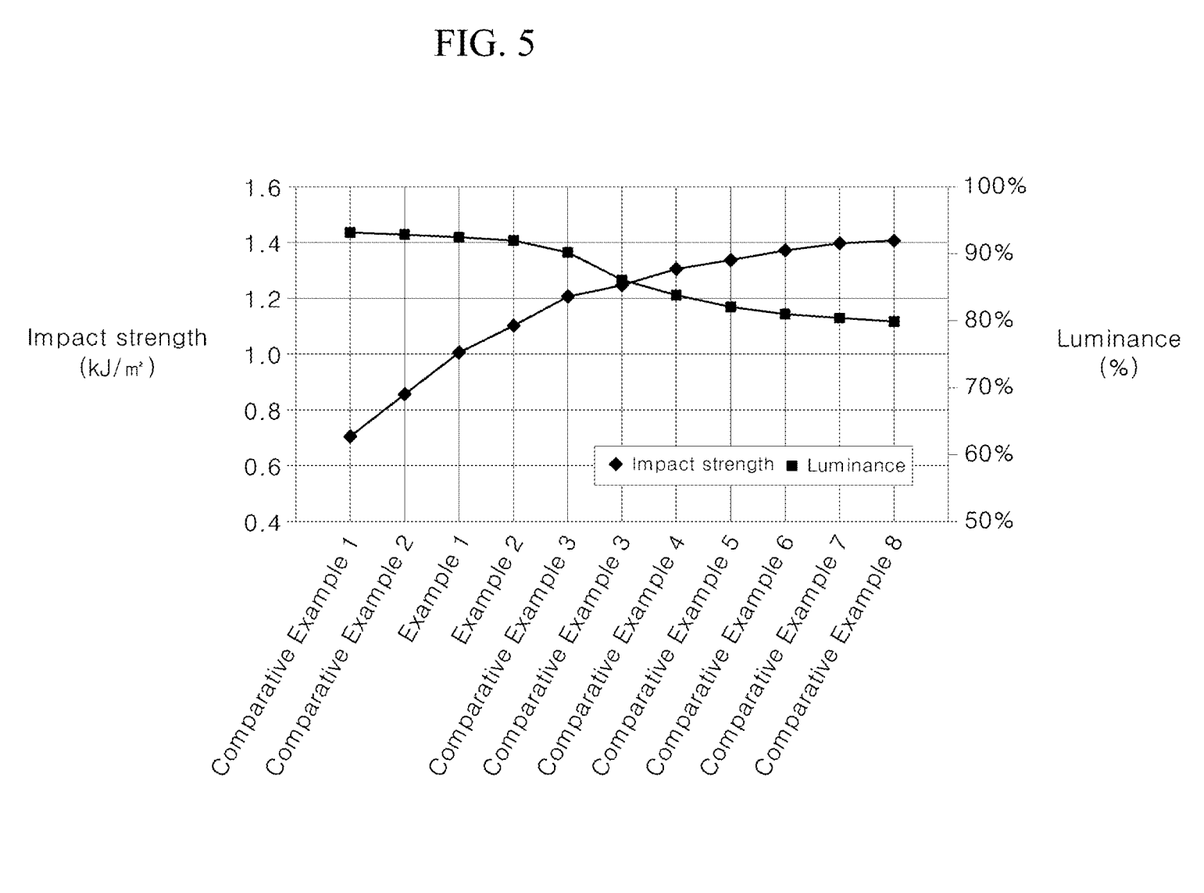
FIG. 5 is a graph showing the values of the measured impact strength and luminance for Examples 1 to 3 and Comparative Examples 1 to 8.

Table 2 shows the results of measurement of impact strength and luminance for Examples 1 to 3 and Comparative Examples 1 to 8, and FIG. 5 is a graph showing the values of the measured impact strength and luminance for Examples 1 to 3 and Comparative Examples 1 to 8.

1) Impact Strength

Notched Izod impact strength was measured according to ASTM D-256.

2) Luminance

The diffuser sheets of Examples 1 to 3 and Comparative Examples 1 to 8 were stacked on a 55-inch direct-type backlight unit (Model name LD550DUN-TKB1 produced by LG Display Co. Ltd.) and then measured using a luminance meter. In doing so, the luminance was expressed in % by dividing the measured luminance value of light after having passed through the diffuser sheet by the reference value of 500 nit, which is the luminance of light emitted from the light source of the backlight unit.

3) Total Transmittance

The diffuser sheets of Examples 1 to 3 and Comparative Examples 1 to 8 were stacked on a 55-inch direct-type backlight unit (LG Display LD550DUN-TKB1) and then measured using a haze meter.

TABLE 2

|  | Luminance (%) | Impact strength (kJ/m$^2$) | Total transmittance (%) |
|---|---|---|---|
| Example 1 | 93 | 1.0 | 33.0 |
| Example 2 | 92 | 1.1 | 32.7 |
| Example 3 | 91 | 1.2 | 32.4 |
| Comparative Example 1 | 95 | 0.72 | 32.0 |
| Comparative Example 2 | 94 | 0.83 | 31.8 |
| Comparative Example 3 | 85 | 1.22 | 31.3 |
| Comparative Example 4 | 84 | 1.31 | 30.4 |
| Comparative Example 5 | 83 | 1.33 | 29.4 |
| Comparative Example 6 | 81 | 1.38 | 27.9 |
| Comparative Example 7 | 80 | 1.39 | 27.0 |
| Comparative Example 8 | 79 | 1.4 | 25.6 |

As shown in Tables 1 and 2 and FIG. 5, in the case of the diffuser sheets according to Examples 1 to 3 and Comparative Examples 1 to 8, the impact strength was increased but the luminance was lowered as the amount of added beads was increased.

In the case of Comparative Example 1 in which only the pores were added to the base resin by 10 wt % without addition of beads, the luminance was as high as 95%, but the impact strength was merely 0.72 kJ/m$^2$, failing to meet a target value.

In the case of Comparative Example 8 in which only beads were added by 10 wt % without adding pores, the impact strength was greatest at 1.4 kJ/m$^2$ and a high opacity was obtained according to the measured transmittance of 25.6%. However, due to addition of a large amount of beads, the luminance was only 79%.

On the other hand, in the case of the diffuser sheets according to Examples 1 to 3, as beads and pores were added at the determined content ratio, the measured transmittance was less than 33%, and high luminance was obtained without deterioration of impact strength.

Based on the above experimental results, it was confirmed that when the beads and pores are added at the determined content ratio as in the cases of the diffuser sheets according to Examples 1 to 3, a high opacity is obtained without deteriorating impact strength and luminance.

Figure 6:
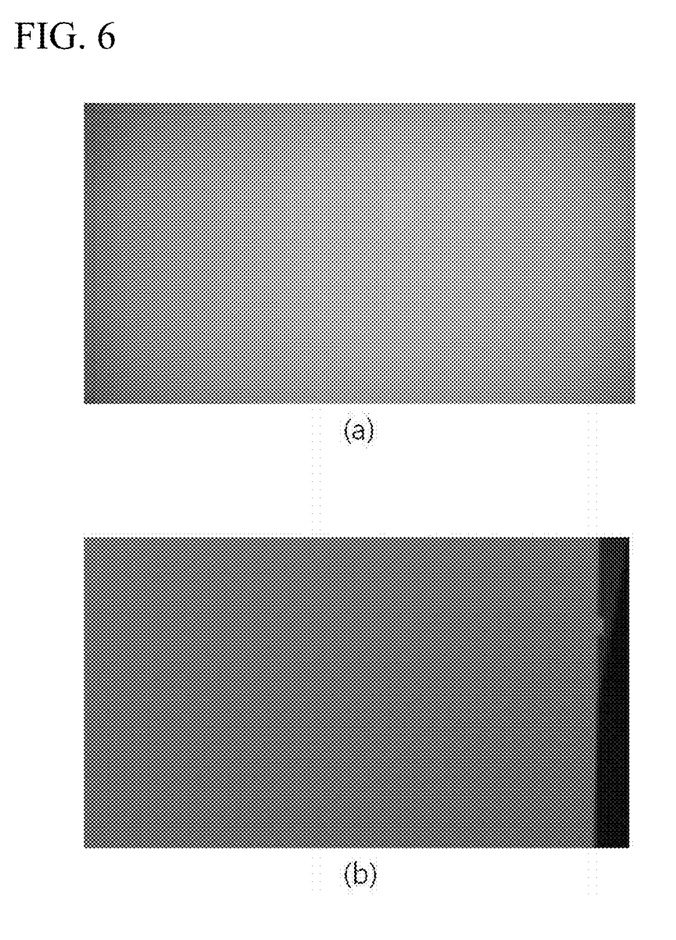
FIG. 6 is a photograph showing a result of an image quality measurement in Example 3.
Figure 7:
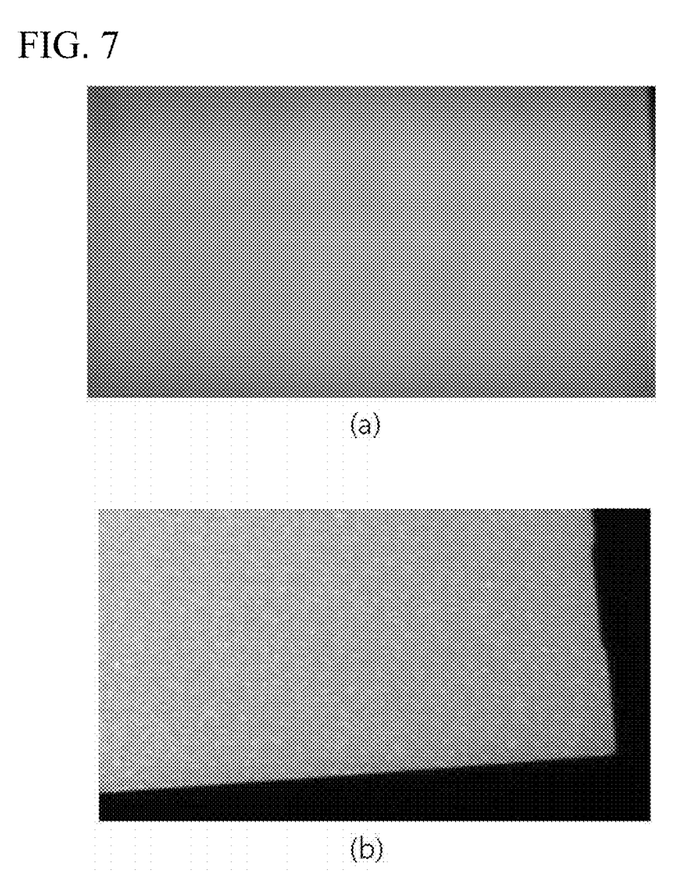
FIG. 7 is a photograph showing a result of an image quality measurement in Comparative Example 9.

FIG. 6 is a photograph showing a result of image quality measurement in Example 3, and FIG. 7 is a photograph showing a result of image quality measurement in Comparative Example 9. In Comparative Example 9, the diffuser sheet was fabricated in the same manner as in Example 1 except that only polystyrene (PS) was used without pores and beads added.

As shown in FIG. 6, when the diffuser sheet according to Example 3 is employed, a high opacity is obtained according to addition of beads and pores, and thus the light source is not visible to the naked eye. As a result, it can be seen that image quality is improved.

On the other hand, as shown in FIG. 7, when the diffuser sheet according to Comparative Example 9 where neither beads nor pores are added is employed, it can be seen that the light source is visible to the naked eye due to insufficient opacity.

It will be apparent to those skilled in the art that various modifications and variations can be made in the diffuser sheet and display device having the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A diffuser sheet, comprising:
   a base layer, the base layer including:
      a base resin,
      a plurality of beads dispersed in the base resin, and
      a plurality of pores dispersed in the base resin;
   a first skin layer on an upper surface of the base layer; and
   a second skin layer on a lower surface of the base layer,
   wherein a diameter of the pores is greater than a diameter of the beads.

2. The diffuser sheet according to claim 1, wherein the first and second skin layers and the base layer are formed of a same resin material, and are integrally attached to each other by coextrusion.

3. The diffuser sheet according to claim 1, wherein beads and pores are absent in the first and second skin layers.

4. The diffuser sheet according to claim 3, wherein a surface of each of the first and second skin layers is cured by heat treatment, and
wherein the surface of each of the first and second skin layers has a hardness greater than a hardness of the base layer.

5. The diffuser sheet according to claim 4, wherein each of the first and second skin layers has a pencil hardness of 3H to 4H, and
wherein the base layer has a pencil hardness of 1H to 2H.

6. The diffuser sheet according to claim 1, wherein the base layer has a thickness of 200 μm to 1,000 μm, and
wherein each of the first and second skin layers has a thickness of 50 μm to 150 μm.

7. The diffuser sheet according to claim 1, wherein the pores have a weight ratio higher than a weight ratio of the beads.

8. The diffuser sheet according to claim 1, wherein the diffuser sheet includes 1.5 wt % to 4.5 wt % of the beads, 5.5 wt % to 8.5 wt % of the pores, and a remaining wt % of the base resin.

9. The diffuser sheet according to claim 1, wherein the diffuser sheet has an impact strength of 1.0 $kJ/m^2$ to 1.5 $kJ/m^2$.

10. A display device, comprising:
a display panel;
a main supporter under the display panel to support an edge of the display panel;
a cover bottom coupled to the main supporter;
a light source mounted on an upper surface of the cover bottom; and
an optical member seated on the main supporter or the cover bottom, the optical member including at least a diffuser sheet,
wherein the diffuser sheet comprises:
a base layer, the base layer including:
a base resin,
a plurality of beads dispersed in the base resin, and
a plurality of pores dispersed in the base resin;
a first skin layer on an upper surface of the base layer; and
a second skin layer on a lower surface of the base layer, and
wherein a diameter of the pores is greater than a diameter of the beads.

11. The display device according to claim 10, wherein the diffuser sheet includes 1.5 wt % to 4.5 wt % of the beads, 5.5 wt % to 8.5 wt % of the pores, and a remaining wt % of the base resin.

12. The display device according to claim 10, wherein the first and second skin layers and the base layer are formed of a same resin material, and are integrally attached to each other by coextrusion.

13. The display device according to claim 10, wherein beads and pores are absent in the first and second skin layers of the diffuser sheet.

14. The display device according to claim 13, wherein a surface of each of the first and second skin layers is cured by heat treatment, and
wherein the surface of each of the first and second skin layers has a hardness greater than a hardness of the base layer.

15. The display device according to claim 14, wherein each of the first and second skin layers has a pencil hardness of 3H to 4H, and
wherein the base layer has a pencil hardness of 1H to 2H.

16. The display device according to claim 10, wherein the base layer has a thickness of 200 μm to 1,000 μm, and
wherein each of the first and second skin layers has a thickness of 50 μm to 150 μm.

17. The display device according to claim 1, wherein the pores have a weight ratio higher than a weight ratio of the beads.

18. The display device according to claim 1, wherein the diffuser sheet has an impact strength of 1.0 $kJ/m^2$ to 1.5 $kJ/m^2$.

19. A diffuser sheet, comprising:
a base layer, the base layer including:
a base resin,
a plurality of beads dispersed in the base resin, and
a plurality of pores dispersed in the base resin;
a first skin layer on an upper surface of the base layer; and
a second skin layer on a lower surface of the base layer
wherein the pores have a weight ratio higher than a weight ratio of the beads.

20. The diffuser sheet according to claim 1, wherein the diffuser sheet includes 5.5 wt % to 8.5 wt % of the pores.

* * * * *